Patented Dec. 8, 1942

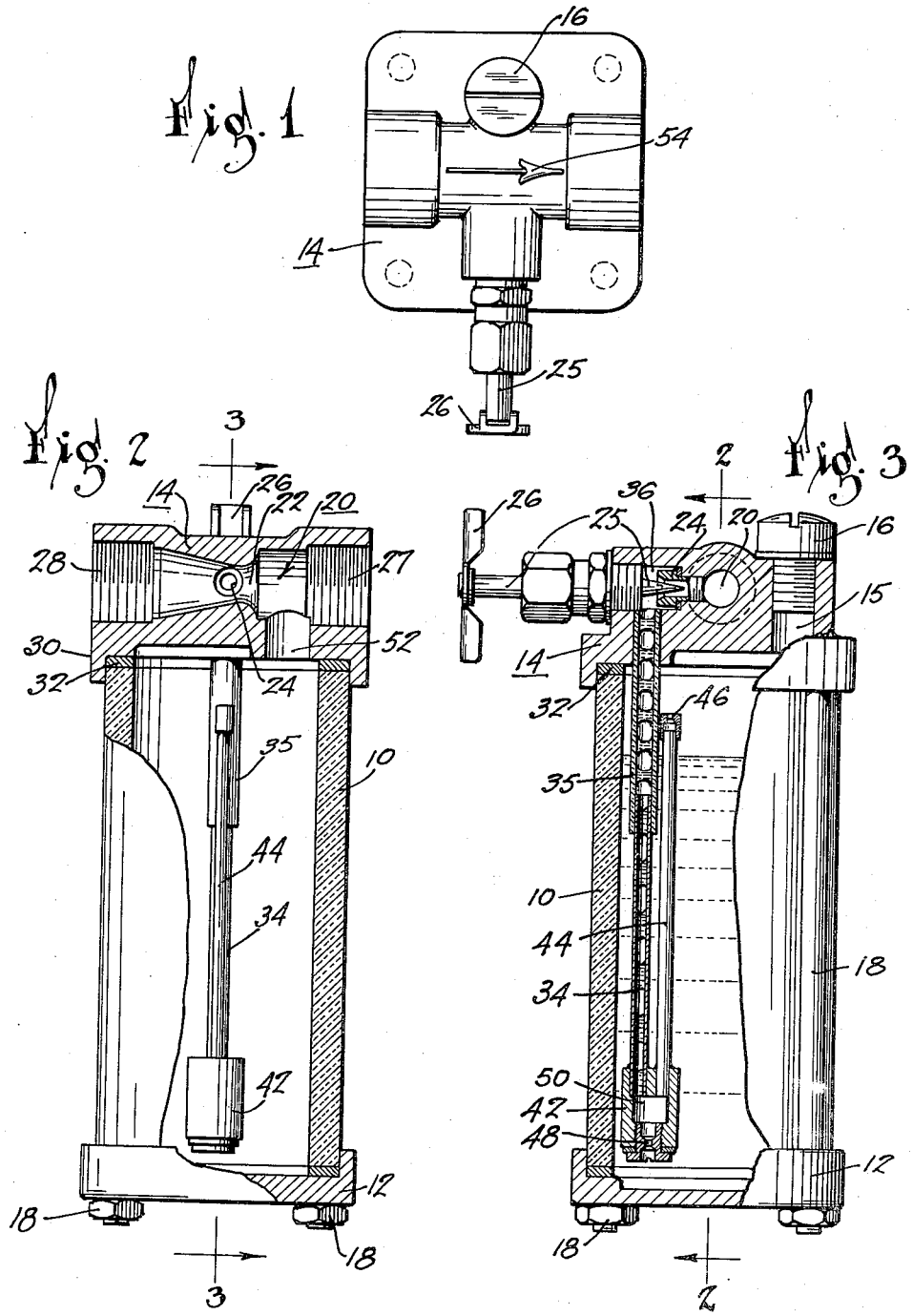

2,304,644

UNITED STATES PATENT OFFICE 2,304,644

LUBRICATOR

Maurice Ben Heftler, Grosse Pointe Park, Mich., assignor to Bendix Aviation Corporation, South Bend, Ind., a corporation of Delaware Application February 23, 1940, Serial No. 320,268

8 Claims. (Cl. 184—55)

This invention relates to lubricating apparatus, and is particularly designed for the lubrication of devices such as pneumatic hammers which are driven by compressed air. Due to the conditions of operation and the construction of such devices, it is advantageous to lubricate by adding to the compressed air or other motive fluid supplied thereto, a continuous stream of lubricant in the form of a spray which is atomized into the motive fluid so as to carburet the same.

The present invention provides means for accomplishing this purpose by utilizing a pressure differential existing at spaced points in the compressed air passage and by utilizing the energy of the flowing air to atomize the lubricant so as to maintain it in suspended condition until it is deposited upon the moving parts of the pneumatic hammer or other device.

The invention also provides a manually adjustable valve for regulating the flow of lubricant to the motivating fluid and further provides visual means whereby the rate of such flow will be readily apparent to the operator.

An object of the invention is to provide a lubricating apparatus wherein a constant quantity of oil will flow in proportion to a constant air flow independently of the oil level in the reservoir.

Another object of the invention is to provide means whereby the rate of lubricant flow will be visible to the operator.

Another object of the invention is to provide a lubricating apparatus responsive to pressure differential within the compressed air passage, wherein the lubricant is atomized by the flowing air and kept in suspended condition until deposited upon the moving parts of the air driven device.

Other objects and desirable particular constructions and arrangements of parts will become apparent upon reference to the following detailed description of the illustrative embodiment shown in the accompanying drawing, in which:

Figure 1 is a plan view of a device embodying the invention;

Figure 2 is a vertical section taken on the line 2—2 of Figure 3; and

Figure 3 is a vertical section taken on the line 3—3 of Figure 2.

Referring more particularly to the drawings the device is seen to comprise a reservoir for liquid lubricant, formed principally by a transparent glass cylinder 10 provided with a bottom closure 12 and having a head 14 mounted thereon. The head is constructed with a lubricant filling passage 15 fitted with a plug 16 for purposes of replenishing the oil supply in the reservoir. The head 14, cylinder 10, and bottom closure 12 are secured together by means such as bolts 18.

A passage 20 for compressed air to be carbureted extends transversely of the head 14 and is provided with a Venturi throat 22 into which a lubricant jet 24 discharges. An adjustable tapered needle valve 25 is provided to control the effective area in the discharge jet 24 and consequently the rate of feed of the lubricant. Valve 25 is provided with the usual sealing glands and is actuated by means of the cross pin 26. The compressed air enters from a pump or other source of pressure through an inlet 27, and leaves through an outlet 28 to pass to the device to be driven thereby. The base 30 of the head 14 forms a cover for the reservoir, suitable gaskets 32 being provided to prevent leakage.

A conduit for lubricant having a lower portion 34 of metal and an upper portion 35 of transparent material leads from a point near the bottom of the reservoir to a passage 36 which communicates with the air passage by way of discharge jet 24. Secured to the lower end of conduit 34 is a cylinder 42 which also receives the lower end of an air tube 44 which extends above the lubricant level and terminates in a calibrated restriction 46. The lower end of cylinder 42 is closed by a threaded plug provided with a calibrated restriction 48 through which the interior chamber 50 of the cylinder communicates with the reservoir below the lubricant level.

Anterior to the Venturi throat 22 an air passage 52 connects the passage 20 with the interior of the reservoir, transmitting to the reservoir a pressure which varies with the air supply pressure and which forces lubricant to flow upwardly through restrictions 48 and conduits 34, 35 at a rate approximately proportionate to the velocity of the compressed air in the passage.

Oil under pressure in the reservoir passes through the restriction 48 to the chamber 50 where it is emulsified with air entering the chamber by way of the calibrated orifice 46 and air tube 44. Alternate slugs of lubricant and bubbles of air pass up the conduit 34 into the transparent conduit 35 and through the discharge jet 24 into the Venturi throat 22. The rate of travel of the lubricant and air through the transparent tube 35 provides the operator with a visible check of the rate of lubricant flow.

The orifices 46 and 48 are so calibrated and proportioned that constant lubricant flow for any given setting of valve 25 will occur with constant air flow in the passage independently of variations in the lubricant level, and upon an increase in the velocity of the air flow in the passage a proportionate increase in flow of lubricant results independently of said level.

In the operation of the device, the reservoir is filled with lubricant to a point below the orifice 46 of the air tube 44. When the air driven tool is put into operation the device begins to feed oil in proportion to the velocity of flow through the venturi 22 for any given setting of the valve 25. As the velocity increases, the depression developed by the venturi increases, feeding a greater amount of lubricant through jet 24 to the Venturi throat 22. Due to the high velocity of air at the Venturi throat the lubricant, even though it may be of relatively high viscosity, will be atomized and carried along by the stream of air in suspended condition to be deposited upon the moving parts of the air driven tool. The absolute quantity of lubricant delivered at any given rate of air flow may be regulated by means of the manually adjustable valve 25.

In order to avoid the possibility of the device being connected into the pressure line in the wrong direction, an arrow 54 is formed on the head 14 pointing in the direction of air flow.

While but one illustrative embodiment has been described in detail, it is not intended to limit the scope of the invention to that particular embodiment or otherwise than by the terms of the appended claims.

I claim:

1. A lubricator for compressed air actuated devices, comprising a passage for compressed air, a lubricant reservoir associated therewith, an unrestricted pressure connection from the passage to the reservoir above the lubricant level therein, a lubricant conveying conduit leading from the reservoir to the passage and having a portion thereof of transparent material, and a connection from the reservoir above the lubricant level therein to the lubricant conveying conduit to bleed air thereinto whereby alternate slugs of lubricant and bubbles of air are formed in the lubricant conveying conduit and fed by said conduit to the passage for compressed air.

2. In a lubricating device having a lubricant reservoir and an air passage associated therewith, flow accelerating means in said passage creating regions of relatively high and low pressure respectively, an unrestricted conduit connecting said high pressure region with the reservoir above the lubricant level, a second conduit having at least a portion thereof of transparent material connecting the low pressure region with the reservoir adjacent the bottom thereof, and means for bleeding air into said second conduit to form alternate slugs of lubricant and air.

3. In a lubricating device having a lubricant reservoir, the combination with a passage for compressed air of an unrestricted pressure conduit connecting the passage and the reservoir above the lubricant level therein, a chamber having an inlet receiving lubricant from the reservoir, an air inlet to the chamber, and a conduit having at least a portion thereof of transparent material leading from the chamber to the passage and receiving alternate portions of lubricant and air from said chamber, said conduit being of small enough cross-sectional area so that said portions of lubricant and air will pass therethrough in the form of sections alternately arranged.

4. In a lubricator, a passage for compressed air, a lubricant reservoir associated therewith, an unrestricted connection from the passage to the reservoir above the lubricant level therein, a conduit having an inlet receiving lubricant from the reservoir and leading to the passage, said conduit having a portion thereof of transparent material, and means for admitting compressed air to said tube anterior to said transparent portion whereby portions of lubricant are formed in said tube spaced apart by layers of air, said tube being of such cross-sectional area that the portions of lubricant and layers of air will be maintained substantially intact throughout the length of said tube.

5. In a lubricator, a reservoir for liquid lubricant, an air passage, an unrestricted connection from the air passage to the reservoir above the lubricant level therein, a discharge jet in the passage, a conduit having a transparent portion leading from the reservoir to the discharge jet, means for bleeding air into said conduit anterior to said transparent portion to form alternate layers of air and lubricant.

6. The invention defined in claim 5 comprising, in addition, manually operable means for varying the flow of lubricant through said conduit.

7. In a lubricating device having a lubricant reservoir, the combination with a passage for compressed air of an unrestricted pressure conduit connecting the passage and the reservoir above the lubricant level therein, a chamber having an inlet receiving lubricant from the reservoir, an air conduit leading to the chamber, the inlet of said air conduit being above the lubricant level in said reservoir, and a lubricant conveying conduit having at least a portion thereof of transparent material leading from the chamber to the passage and receiving alternate portions of lubricant and air from said chamber.

8. In a lubricator, an air passage, a reservoir for liquid lubricant, an unrestricted connection from the air passage to the reservoir above the liquid level therein, a conduit having at least a portion thereof of transparent material and leading from the reservoir to the air passage, and means for bleeding air into said conduit anterior to the transparent portion.

MAURICE BEN HEFTLER.